US011596249B2

(12) United States Patent
Porter, Jr. et al.

(10) Patent No.: US 11,596,249 B2
(45) Date of Patent: Mar. 7, 2023

(54) PORTER AIR TOUCH

(71) Applicants: Jerome Porter, Jr., Lufkin, TX (US); Daniel Otis Murray, Apple Springs, TX (US)

(72) Inventors: Jerome Porter, Jr., Lufkin, TX (US); Daniel Otis Murray, Apple Springs, TX (US)

( * ) Notice: Subject to any disclaimer, the term of this patent is extended or adjusted under 35 U.S.C. 154(b) by 0 days.

(21) Appl. No.: 17/226,079

(22) Filed: Apr. 9, 2021

(65) Prior Publication Data
US 2022/0322854 A1 Oct. 13, 2022

(51) Int. Cl.
*A47G 19/22* (2006.01)
*F21V 33/00* (2006.01)
*H02J 50/10* (2016.01)
*F21Y 115/10* (2016.01)

(52) U.S. Cl.
CPC ...... *A47G 19/2227* (2013.01); *F21V 33/0036* (2013.01); *H02J 50/10* (2016.02); *A47G 2019/2238* (2013.01); *F21Y 2115/10* (2016.08)

(58) Field of Classification Search
CPC ........ A47G 19/2227; A47G 2019/2238; A47G 23/0309; A47G 19/2205; H02J 50/10; H02J 7/00; H02J 7/35; F21V 33/0036; F21V 31/00; F21Y 2115/10; H03K 17/962
See application file for complete search history.

(56) References Cited

U.S. PATENT DOCUMENTS

| 4,344,113 | A | * | 8/1982 | Ditto | A47G 23/0309 362/101 |
|---|---|---|---|---|---|
| 5,211,699 | A | * | 5/1993 | Tipton | A47G 19/2227 362/101 |
| 2015/0097769 | A1 | * | 4/2015 | Russell | G06F 3/147 345/156 |
| 2015/0159822 | A1 | * | 6/2015 | Mohr | F21V 33/0036 362/101 |

* cited by examiner

*Primary Examiner* — Bao Q Truong

(57) ABSTRACT

The Porter Air Touch is a wireless powered LED drinking glass with internal LED lights that emits light but does not require internal batteries. The drinking glass internal LED lights receive energy via a large flat surface that emits an electromagnetic field. The electromagnetic field emitted from the two inductive plates permeates through a non-conductive barrier that reaches the bottom of the LED drinking glass. Two metallic drinking glass aluminum contact plates along the bottom of the LED drinking glasses absorb the electromagnetic energy from the inductive plates and powers the LED lights wirelessly.

3 Claims, 4 Drawing Sheets

PORTER AIR TOUCH

CROSS-REFERENCE TO RELATED DOCUMENT

The present application claims priority to provisional patent application No. 63/149,279, filed on Feb. 14, 2021, disclosure of which is incorporated herein at least by reference.

BACKGROUND OF THE INVENTION

1. Field of Invention

The present invention relates to a drinking glass with internal light emitting diodes (LEDs) that do not require internal batteries to emit photons. The LED lights internal to the drinking glass are able to emit photons while placed on a non-conductive surface and receive energy from a metallic material beneath the non-conductive material via an electromagnetic field. The electromagnetic field emitting from the metallic surface allows the LEDs internal to the drinking glass to emit photons on any area of the metallic surface beneath the non-conductive barrier along 360 degrees of the bottom of the drinking glass. The activation of the LEDs internal to the drinking glass happens by an aluminum touch sensing switch on the glass. Depending on the ratio of the two inductive plate sizes, touch less activation can also be achieved. The LED drinking glass internal LEDs can also emit photons without human touch if the drinking glass is placed on a non-conductive material and two independent metallic surfaces beneath the non-conductive material are emitting an electromagnetic field.

2. Discussion of the State of the Art

There are several drinking glasses on the market that have internal LED lights. The current technology of LED drinking glasses requires the LED lights to have internal batteries in the bottom of the drinking glass in order to power the LED lights. There is a need to create an independent external surface that the drinking glasses can be placed on to wirelessly power the internal LEDs without internal batteries. The current state of the art does not allow for the LED drinking glass to be able to receive energy from an electromagnetic surface. Current LED drinking glasses should be able to receive energy and be activated from an electromagnetic surface along 360 degrees of freedom along the bottom of the LED drinking glass via touch activation. LED drinking glasses that no longer require internal batteries or can be controlled via touch sensing prevents "on" and "off" switch wear and tear and reduces the hassle of locating, purchasing and installing internal batteries.

SUMMARY OF THE INVENTION

In one embodiment of the invention a Porter Air Touch wireless powered LED Drinking Glass is provided, comprising, a drinking glass that has internal LEDs lights that are powered when the drinking glass is placed on a surface with an electromagnetic field between a non-conductive barrier. The drinking glass has internal LED lights, no internal batteries and a touch sensing activation contact surface.

Also in one embodiment an electronic circuit that creates an electromagnetic field through a metallic surface. A second circuit is inside the LED drinking glass that receives energy from the metallic surface via an electromagnetic field. The circuit for creating an electromagnetic field within a metallic surface is comprised of one NPN transistor (4), five 10K ohm resistors (5), one center tapped induction coil (1), two non-center tapped induction coils (2,3), two inductive metallic plates (6,7) with a non conductive barrier (12). The circuit for one drinking glass contains three internal LED lights and two metallic plates on the bottom of the drinking glass.

In another aspect of the invention a method for turning "on" or "off" the LEDs lights inside the LED drinking glass via a touch sensing switch; which turns the LEDs "on" when the touch sensing switch senses a human hand or finger. When "inductive plate 2" (7) physical size is increased compared to "inductive plate 1" (6) LEDs on the drinking glass will emit light when a human finger or hand is in the proximity of the drinking glass versus the touch sensing switch having to be physically touched. The physical size differences between "inductive plate 1" (6) and "inductive plate two" (7) usually requires a ratio of 1 to 2 before the touch less activation can be utilized.

DETAILED DESCRIPTION OF THE INVENTION

Figure 1:
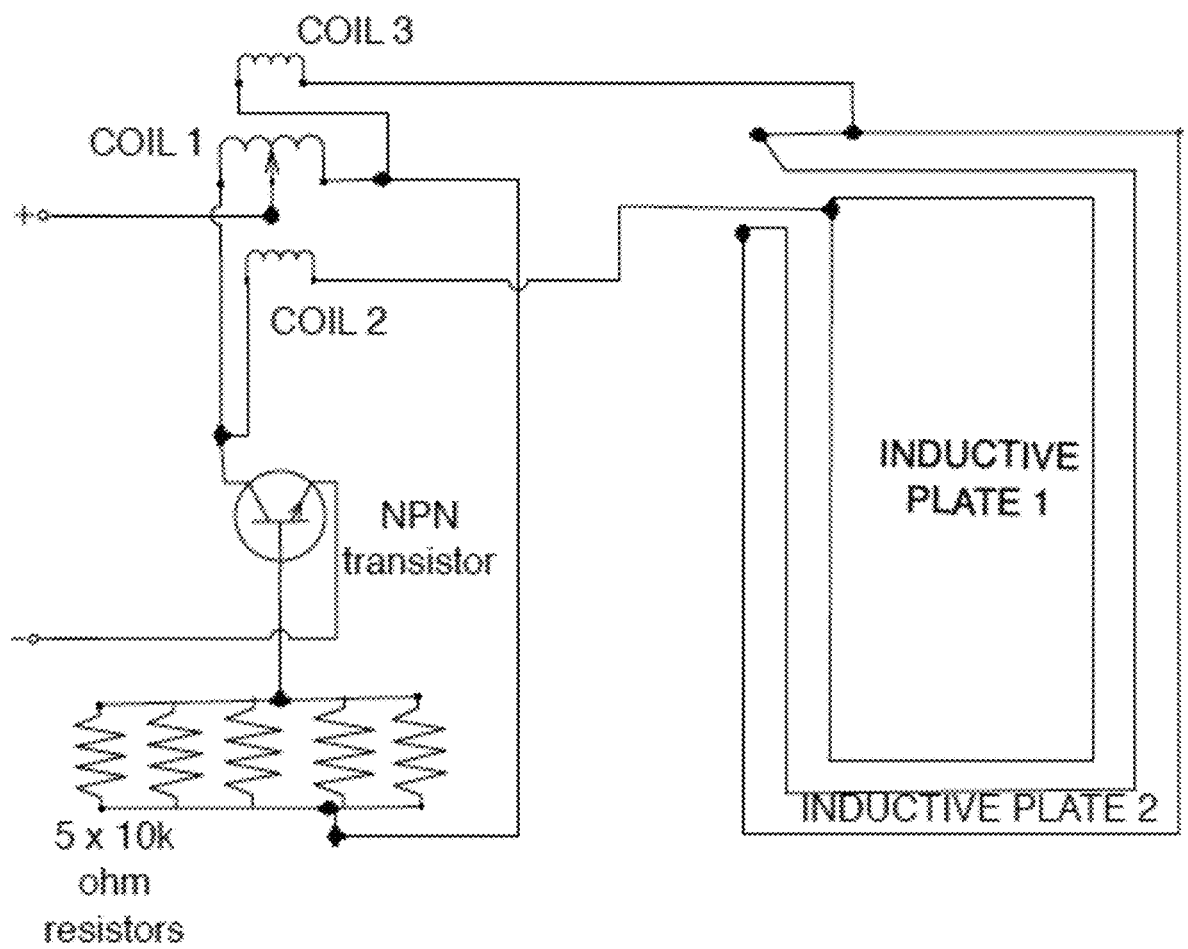
FIG. 1 is a labeled visual description of a circuit that is required to create an electromagnetic field within two inductive plates that wirelessly power a LED drinking glass.
Figure 2:
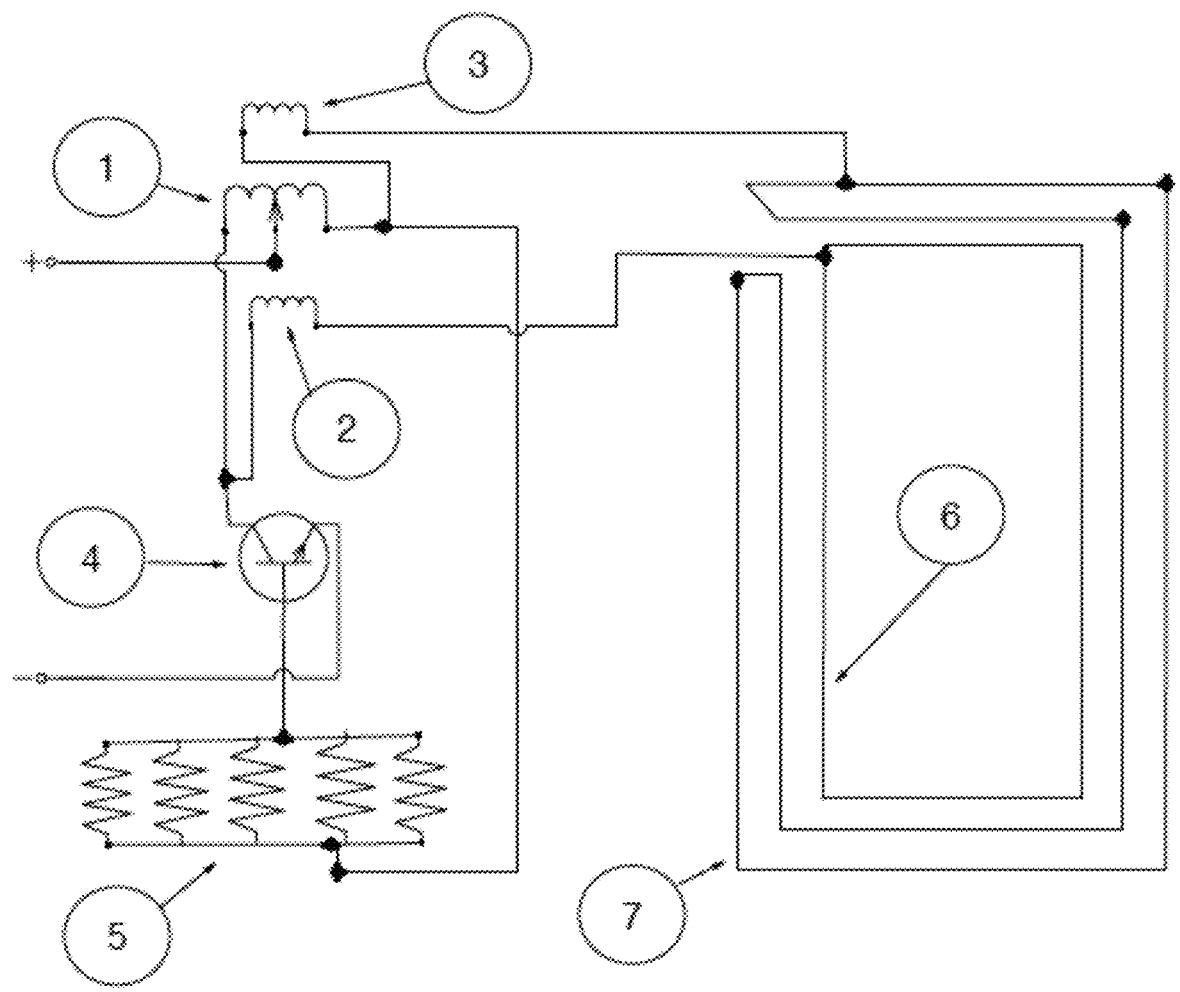
FIG. 2 is a numbered visual description of a circuit that is required to create an electromagnetic field within two inductive plates that wirelessly power a LED drinking glass.
Figure 3:
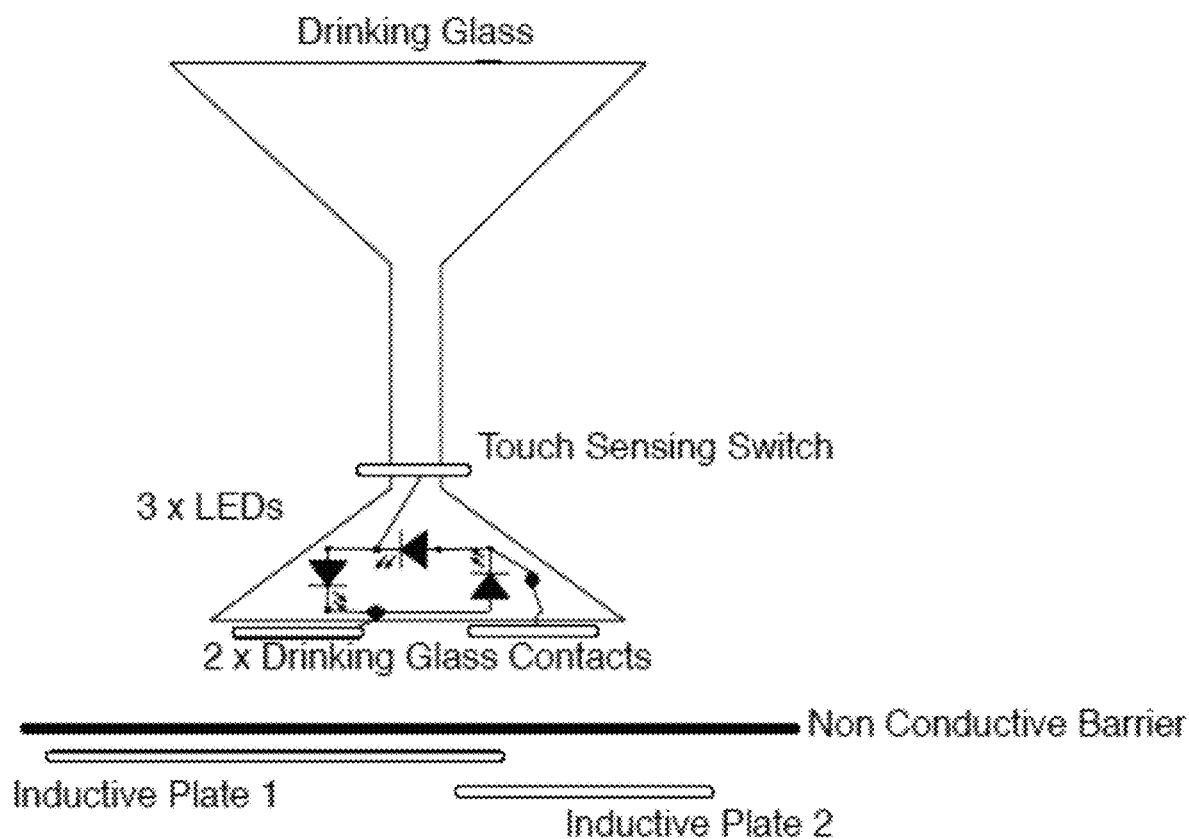
FIG. 3 is a labeled visual description of a LED drinking glass and circuit that can be activated via sensing a human touch.
Figure 4:
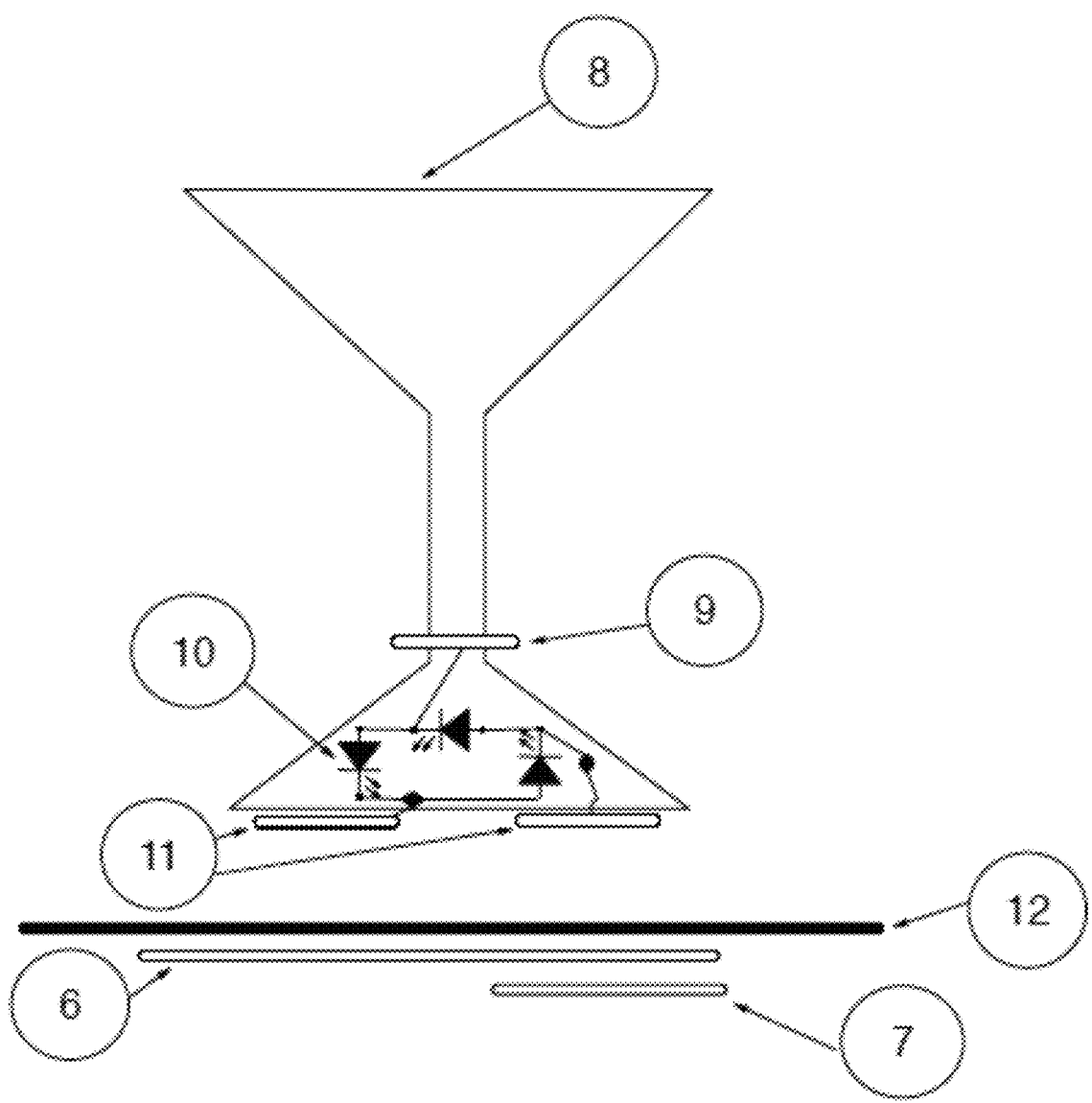
FIG. 4 is a numbered visual description of a LED drinking glass and circuit that can be activated via senses a human touch.

The Porter Air Touch Wireless Powered LED Drinking glass system consist of a circuit for creating an electromagnetic field that is imbedded in a flat surface, such as a table, furniture, countertop or paper. A second circuit is placed inside the LED drinking glass that receives an induced voltage via the flat electromagnetic field surface; which allows the internal LEDS in the LED drinking glass to emit light without internal batteries. The LED drinking glasses are placed on a non-conductive surface such as paper or vinyl and beneath the non-conductive material are two inductive plates that emit an electromagnetic field.

The circuit that creates an electromagnetic field in the inductive plates (6,7) consist of a NPN transistor (4), coil 1 (1), coil 2 (2), coil 3 (3) and five 10 k ohm resistors (5). The NPN transistor (4), and coil 1 (1), and five 10 k ohm resistors (5) convert 3 to 4 volts DC at 600 ma from an AC to DC wall adapter into an alternating current that emits from coil 1 (1). A wire is connected to the collector of the NPN transistor (4) and the other end of the wire connects to coil 2 (2); which is connected to inductive plate 1 (6). An additional wire is connected to a point between the five 10 k ohm resistors (5) and coil 1 (1) and the other end of the wire connects to coil 3 (3); which is connected to inductive plate 2 (7). Coil 2 and Coil 3 (2,3) receive and induced voltage from Coil 1 (1) that strengthens the electromagnetic field in inductive plate 1 (6) and inductive plate 2 (7); which increases the brightness of the LEDs inside the LED drinking glasses.

The circuit inside of the LED drinking glass consist of three LED (10) lights wired in series negative to positive. One wire is connected to a point between a negative lead from one LED (10) and the positive lead of another LED (10); which is connected to one of the two drinking glass contacts (11) on the bottom of the LED drinking glass (8). A second wire is connected between a second point on another positive lead of one LED light (10) and negative lead of another LED light (10); which is connected to the other drinking glass contact (11) on the bottom of the LED drinking glass (8). A third wire is connected between a third point between the negative and positive lead of two adjacent LED lights (10); which is connected to the touch sensing switch (9).

The LED drinking glass (8) LED lights (10) can be activated to emit light in several ways. Placing the LED drinking glass (8) on the non-conductive barrier (12) with inductive plate one (6) directly beneath the non-conductive barrier will cause the LEDs (10) in the LED drinking glass to emit light when the touch sensing switch (9) senses a human touch. Placing the LED drinking glass (8) on the non-conductive barrier (12) with inductive plate 1 (6) beneath the non-conductive barrier under one of the drinking glass contacts (11) and inductive plate 2 (7) beneath non-conductive barrier (12) under the adjacent drinking glass contact (11) will allow the LED drinking glass LEDs to emit light without a human touch.

What is claimed is:

1. A LED drinking glass and electromagnetic field surface comprising of:
    a NPN transistor, five 10 k ohm resistors, a center-tapped induction coil (1), a non-center tapped induction coil (2), a non-center-tapped induction coil (3), an aluminum inductive plate (6), an aluminum inductive plate (7), and a non-conductive barrier (12) for an electromagnetic field producing surface and a LED drinking glass that consist of a set of aluminum contacts (11), an aluminum touch sensing switch (9) and three LED lights (10); the electromagnetic field producing circuit uses the NPN transistor, the five 10 k ohm resistors, and the center-tapped induction coil (1) to create an alternating current in the center-tapped induction coil (1); the non-center-tapped induction coil (2) is connected to a collector of the NPN transistor; which is connected to the aluminum induction plate (6); which is 9" wide and 6" long; the non-center-tapped induction coil (3) is connected at a point between the five 10 k ohm resistors and the center-tapped induction coil (1); which is connected to aluminum inductive plate (7); which is 1.5 inches in width and goes around the border of the aluminum induction plate (6) with a quarter inch gap between inductive plate (6) and (7); the non-centered-tapped induction coil (2) and the non-center-tapped induction coil (3) are placed adjacent to the center-tapped induction coil (1) to receive an induced voltage; which increases the electromagnetic field in aluminum inductive plates (6) and (7); the LED drinking glass has three internal LED lights (10) that are able to emit photons without internal batteries in the drinking glass; the LED lights in the drinking glass receives energy from the set of drinking glass aluminum contacts (11) that absorb electromagnetic energy from aluminum inductive plate (6) and or aluminum inductive plate (7); which permeates through the non-conductive barrier.

2. A method of turning "on" the LED lights in the LED drinking glass of claim 1,
    the LED drinking glass can be turned "on" by touching the aluminum touch sensing switch on the LED drinking glass when the LED drinking glass is placed on the non-conductive barrier; the LED lights in the LED drinking glass can also be turned "on" by placing the LED drinking glass on the non-conductive surface while simultaneously having the drinking glass overlapping aluminum inductive plate (6) and aluminum inductive plate (7) that are beneath the non-conductive surface.

3. A method of LED lights absorbing energy from an electromagnetic field,
    a set of three LED lights are connected in series negative to positive one wire is connected to two joined LED leads and the other end of the wire is connected to an aluminum drinking glass contact a second wire is connected to a different set of joined LED leads along the LED lights connected in series and the other end of the wire is connected to a second aluminum drinking glass contact; when the two wired aluminum drinking glass contacts are placed in an electromagnetic field the LEDs are able to absorb electromagnetic energy and produce light; the LED lights can also be activated when a third wire is connected to another set of joined LED leads and the other end of the wire is connected to an aluminum touch sensing switch that is activated by a human hand or finger.

* * * * *